(12) United States Patent
Coleman et al.

(10) Patent No.: US 9,904,162 B2
(45) Date of Patent: Feb. 27, 2018

(54) MULTIPLE PROJECTOR IMAGING SYSTEM

(71) Applicant: RealD Inc., Beverly Hills, CA (US)

(72) Inventors: David A. Coleman, Louisville, CO (US); Miller H. Schuck, Erie, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 15/059,268

(22) Filed: Mar. 2, 2016

(65) Prior Publication Data

US 2016/0261831 A1 Sep. 8, 2016

Related U.S. Application Data

(60) Provisional application No. 62/127,090, filed on Mar. 2, 2015.

(51) Int. Cl.
| | |
|---|---|
| *G03B 21/20* | (2006.01) |
| *G03B 21/28* | (2006.01) |
| *H04N 9/31* | (2006.01) |
| *G03B 21/14* | (2006.01) |

(52) U.S. Cl.
CPC ........... *G03B 21/28* (2013.01); *G03B 21/145* (2013.01); *H04N 9/3147* (2013.01)

(58) Field of Classification Search
CPC ..... G03B 21/28; G03B 21/145; H04N 9/3147
See application file for complete search history.

(56) References Cited

U.S. PATENT DOCUMENTS

| | | | | |
|---|---|---|---|---|
| 4,327,968 | A * | 5/1982 | Yevick | G03B 21/11 353/38 |
| 6,570,623 | B1 * | 5/2003 | Li | H04N 9/3194 348/383 |
| 7,857,455 | B2 | 12/2010 | Cowan et al. | |
| 7,898,732 | B2 | 3/2011 | Coleman et al. | |
| 7,905,602 | B2 | 3/2011 | Schuck et al. | |
| 8,328,362 | B2 | 12/2012 | Coleman et al. | |
| 8,851,680 | B2 | 10/2014 | Sharp et al. | |
| 2008/0143969 | A1 * | 6/2008 | Aufranc | G03B 21/26 353/30 |
| 2011/0019108 | A1 * | 1/2011 | Nelson | H04N 9/31 348/745 |
| 2014/0028697 | A1 * | 1/2014 | Kurtz | G01J 3/465 345/589 |

\* cited by examiner

*Primary Examiner* — Sultan Chowdhury
*Assistant Examiner* — Magda Cruz
(74) *Attorney, Agent, or Firm* — Penny L. Lowry; Neil G. Mothew

(57) ABSTRACT

Disclosed is an apparatus and method of tiling and stitching together multi-projector images. The projection system enhances brightness, enables polarization based stereoscopic imagery and matches brightness for all viewers that view the images from the projection system. The projection system includes two or more projectors and projects two dimension and three dimensional images onto projection screens, such as gain screens.

20 Claims, 8 Drawing Sheets

MULTIPLE PROJECTOR IMAGING SYSTEM

RELATED APPLICATIONS

This application claims priority to U.S. Provisional Application No. 61/127,090 filed Mar. 2, 2015 entitled "Multiple projector image display system and method thereof," incorporated herein by reference.

TECHNICAL FIELD

This disclosure generally relates to image projection, and more specifically relates to multiple projectors that may be used to project images on screens with directional gain profiles.

BACKGROUND

Single projectors may produce images of varying size and the brightness may vary by adjusting the intensity of the lamps in the projectors. At some point though, the brightness of the image for a large screen may be limited by the projector, since single projectors may produce an image that may be limited by the lamp within the individual projector.

BRIEF SUMMARY

According to the present disclosure, a projection system may include at least a first projector and a second projector located to produce imagery, wherein the first projector provides first image light and the second projector provides second image light, further wherein the first image light and the second image light may be stitched together to produce an entire image and substantially reducing any undesirable non-uniformities between the first image light and the second image light.

According to the present disclosure, a multi-projector system may include a plurality of projectors configured to project imagery light. The plurality of projectors may include a first projector configured to project a first portion of a stitched image along a first light path and a second projector configured to project a second portion of a stitched image along a second light path. The multi-projector system may further include a first reflective element disposed in the first light path, wherein the first reflective element is configured to align the first light path relative to the second light path such that the stitched image comprises a transition region in which the first portion and second portion of the stitched image overlap, and imagery light from the first and second projectors within the transition zone have an angular deviation, theta, therebetween, ranging between about 0° to about 1°.

According to the present disclosure, a multi-projector unit may include a housing, a plurality of projectors configured to project imagery light. The plurality of projectors may include a first projector disposed in the housing and configured to project a first portion of a stitched image along a first light path and a second projector disposed in the housing and configured to project a second portion of a stitched image along a second light path. The multi-projector unit may further include a first reflective element disposed in the first light path, wherein the first reflective element is configured to align the first light path relative to the second light path such that the stitched image comprises a transition region in which the first portion and second portion of the stitched image overlap. The housing may be configured with predetermined clearance for a plurality of alignments of the first and second light paths.

According to the present disclosure, a multi-projector display system may include a gain screen and a plurality of projectors configured to project imagery light to the gain screen. The plurality of projectors may include a first projector configured to project a first portion of a stitched image along a first light path and a second projector configured to project a second portion of a stitched image along a second light path. The multi-projector display system may further include a reflective element disposed in the first light path, wherein the reflective element are configured to align the first light path relative to the second light path such that such that the stitched image comprises a transition region in which the first portion and second portion of the stitched image overlap, and a gradient within the transition region is less than a just noticeable difference (JND).

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

According to the present disclosure, a projection system may include at least a first projector and a second projector located to produce imagery, wherein the first projector provides first image light and the second projector provides second image light, further wherein the first image light and the second image light is stitched together to produce an entire image substantially reducing any undesirable non-uniformities between the first image light and the second image light. Undesirable non-uniformities may include changes in brightness, misalignment between images provided by each of the projectors, changes in reflectivity intensity of each of the projectors images depending on viewer location, and so forth.

Single projectors may produce images of varying size and the brightness may vary by adjusting the intensity of the lamps in the projectors. At some point though, the brightness of the image for a large screen may be limited by the projector, since single projectors produce an image that may be limited by the lamp within the individual projector.

Tiled and stitched images from multiple projectors have the potential to produce very bright images with higher resolution and aspect ratios which may be very different from single projector offerings. However, when used on screens with directional gain profiles (i.e., screens with directionality), such as gain screens, to enhance brightness, enable polarization based stereo, or to make use of any of the other advantages disclosed in the commonly owned U.S. Pat. No. 7,898,732, entitled "Polarization preserving front projection screen," to Coleman et al, filed Jan. 28, 2009, which is herein incorporated by reference in its entirety, it becomes desirable to at least approximately match the projector brightness for all viewers.

Figure 1:
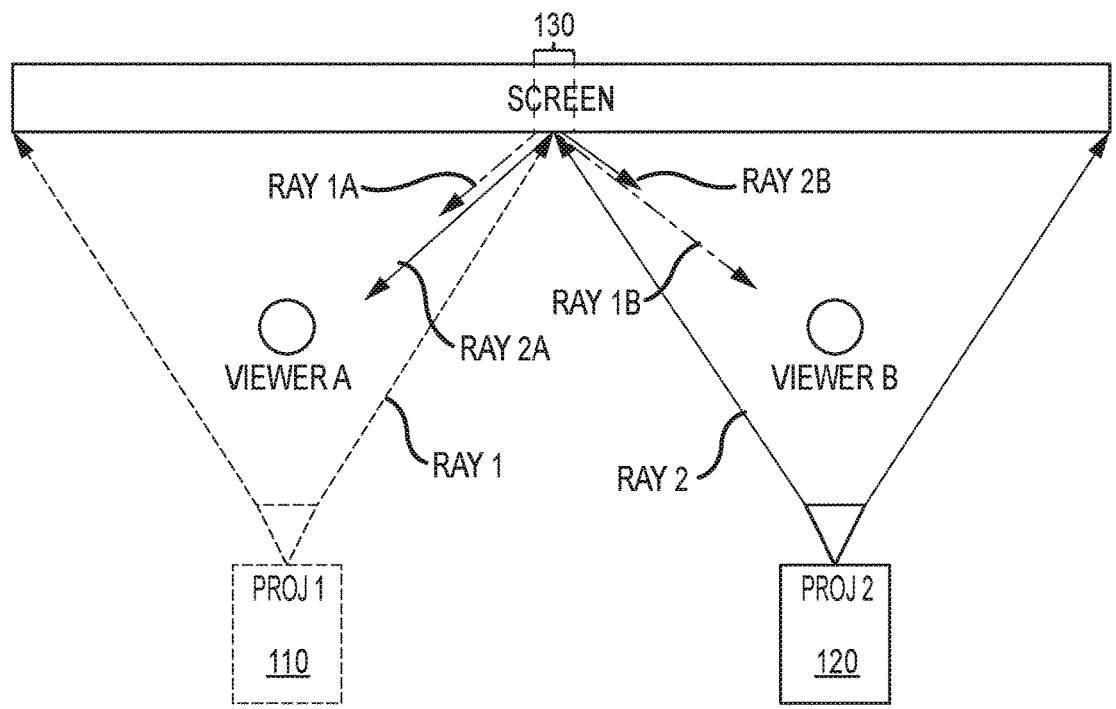
FIG. 1 is a schematic diagram illustrating one embodiment of a multi-projector tiled image, in accordance with the present disclosure.

Multiple projectors can be used to increase the resolution of a projected image, change the aspect ratio, for example extreme panoramic images, increase the image size, etc. In one embodiment as shown in FIG. 1, the output from multiple projectors can be arrayed to obtain a larger image, for example, with the additive resolution of all of the projectors. FIG. 1 is a schematic diagram illustrating one embodiment of a multi-projector tiled image. FIG. 1 includes illustration depicting projecting a tiled image onto a screen from two projectors 110, 120. Viewers at points A and B receive different brightness from each projector at the transition region 130 between projectors 110, 120. As illustrated in FIG. 1, Viewer A may receive a brighter reflection Ray 2A from Projector 2 and a dimmer reflection Ray 1A from Projector 1. Similarly Viewer B may receive a brighter reflection Ray 1B from Projector 1 and a dimmer reflection Ray 2B from Projector 2. Due to the locations of Viewer A and Viewer B, Viewers A and B may be able to perceive a brightness difference between the two projectors.

It may be possible with the correct optics to perfectly align the pixels from adjacent projectors to obtain a seamless tiled display. However, in practice, some form of stitching may be in order to compensate any non-uniformities between the projectors.

Figure 2:
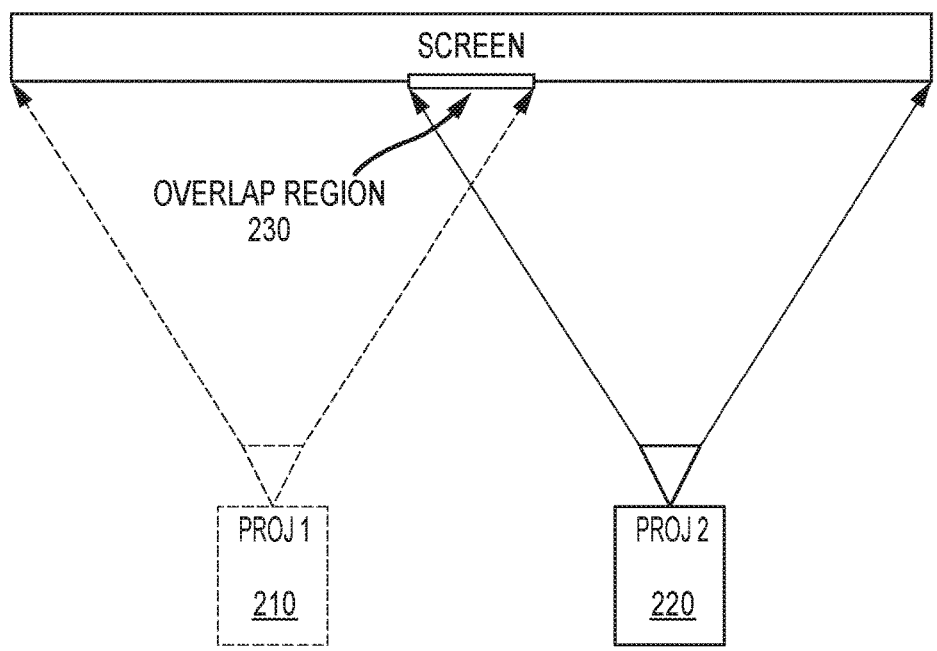
FIG. 2 is a schematic diagram illustrating one embodiment of a multi-projector stitched image, in accordance with the present disclosure.

Image stitching in projection includes overlapping the illumination from two or more projectors onto the screen as shown in FIG. 2 and then blending the image between the projectors in order to obtain a substantially seamless image.

FIG. 2 is a schematic diagram illustrating one embodiment of a multi-projector stitched image. Further, FIG. 2 is a schematic of projecting a stitched image onto a screen from two projectors 210, 220. Output from both of the projectors may overlap over part of the region 230.

In practice the system may be calibrated by using a camera to capture the output from each of the projectors. The calibration data may be then used to calculate how to share the image pixel data between the projectors to obtain a smooth image. For illustration purposes only and not of limitation, all FIGUREs in this document will be shown with zero overlap but any of the embodiments are intended to be used with or without overlap between the projected images from the individual projectors. Further, all of the FIGUREs are for illustrative purposes, and not drawn to scale. In practice, it is desirable to minimize the overlap region in order to make optimum use of the resolution and brightness of both projectors.

One of the challenges with stitching an image from multiple projectors is the directionality of the screen luminance. The luminance at any viewing location depends on both the angle from the viewer to the screen and the angle from the screen to the projector. For any single viewing location, for example the calibration camera location, it is possible to adjust the pixel intensity such that the brightness from each source is approximately identical. However, for any other viewing position, the brightness is no longer matched. Consider the case shown in FIG. 1. From the transition point between the two projected images, Viewer A receives ray 1A from projector 110 and ray 2A from projector 120. Ray 2A is scattering in a nearly specular direction and has high intensity. Ray 1A is scattering back toward projector 110 and as such has much less intensity than Ray 2A. If the system were calibrated from this location, then projector 110 may be increased in intensity and projector 120 may be decreased in intensity, or any suitable combination, to match the brightness from both projectors. However, the situation may be reversed for viewer B. The image from projector 120 may be dim relative to that of projector 110. Viewer B may perceive a change in intensity across the boundary.

The magnitude of this effect depends upon the directionality of the projection surface. Lambertian and near-Lambertian screens such as matte white screens have minimal directionality in the reflected intensity. Consequently, projection image stitching and tiling applications utilize matte white screens. Unfortunately, matte white screens are lower in brightness than gain screens and so the image brightness suffers. Furthermore, matte white screen do not preserve polarization and so are not usable or appropriate in polarization-based stereoscopic, 3D imagery.

Figure 3:
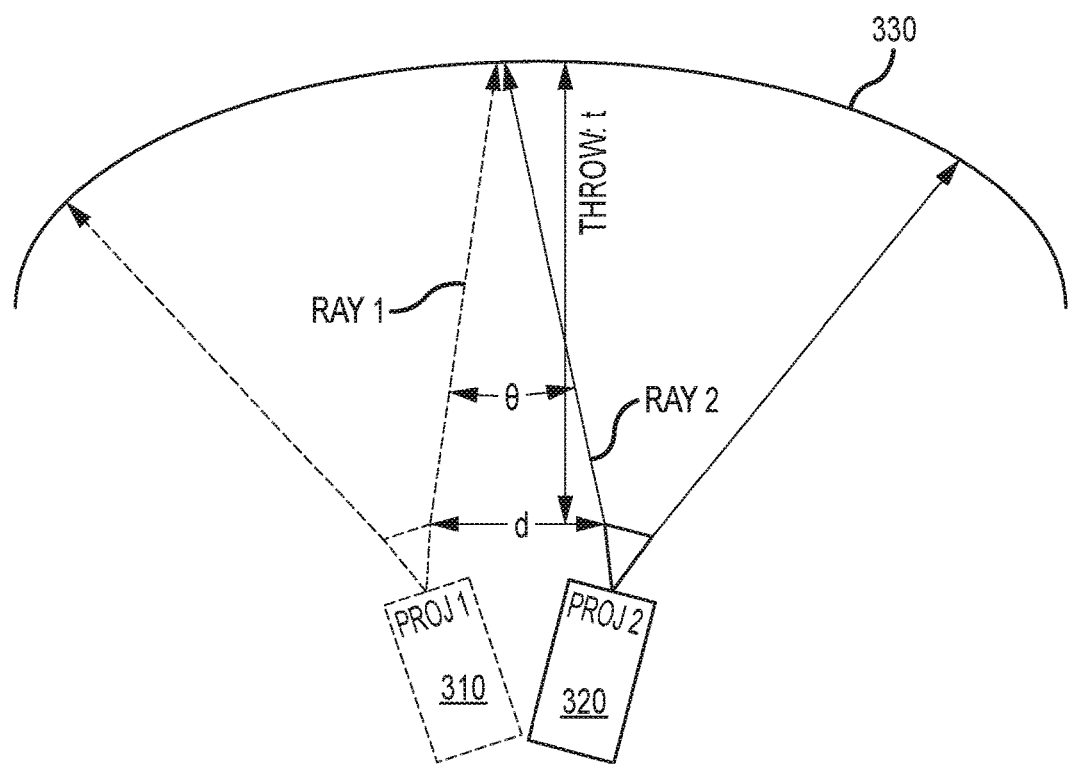
FIG. 3 is a schematic diagram illustrating one embodiment of a multi-projector stitched image with projectors close together, in accordance with the present disclosure.

In order to utilize non-Lambertian projection screens in a tiled or stitched application, the angular distribution of the scattered light off of the screen may be accounted for. FIG. 3 shows a schematic for two projectors that have been moved as close as possible, which may be limited by mechanical interference between the projectors/lenses. FIG. 3 is a schematic diagram illustrating one embodiment of a multi-projector stitched image with projectors close together. Further, FIG. 3 is a schematic of projecting a stitched image onto a screen from two projectors 310, 320. FIG. 3 and other FIGUREs discussed herein illustrate a curved screen 330 for illustrative purposes only, and the curvature of the screen is not illustrated to scale. Moreover, the screens illustrated in the FIGUREs discussed herein may be gain screens and the screens may also substantially preserve polarization properties of the imagery projected.

Projectors 310, 320 may be located as close as possible to minimize the angular difference, theta, between overlap rays 1 and 2 caused by the distance d between their origination points. The distance between the projectors may be limited by the projector housings.

Figure 4A:
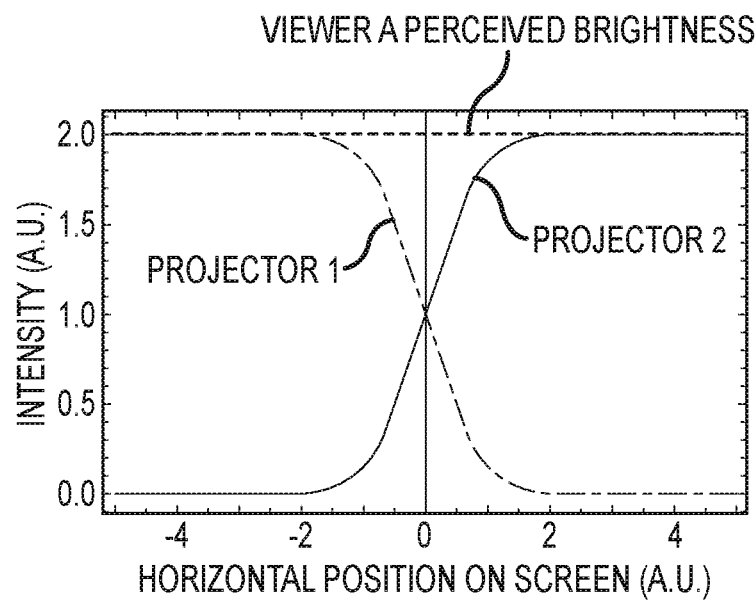
FIGS. 4A and 4B are schematic diagrams illustrating representations of screen intensity across transition regions, in accordance with the present disclosure.
Figure 4B:
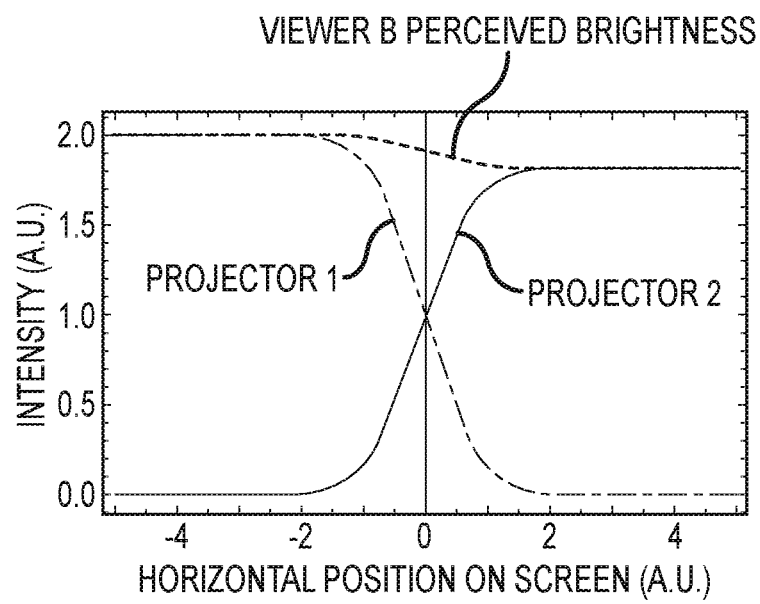

The angle θ between rays 1 and 2 at the midpoint of the transition zone is given by $$\theta = 2\mathrm{Tan}\left(\frac{d}{2t}\right) - 1$$

in which d is the distance between the rays origination points and t is the throw (distance to the screen). The distance d may depend on a number of factors including but not limited to projection lens size, projector size, polarization optics size, any combination thereof, and so forth. For example, a pair of projectors with width 45 cm at a distance of 18 meters from the screen may have an angle θ=1.4 degrees. For typical gain curves, this may produce a change in brightness as large as ten percent between different viewers as shown in FIG. 4. FIGS. 4A and 4B are schematic diagrams illustrating representations of screen intensity across transition regions. Further, FIG. 4A depicts a perceived brightness for viewer A for a projector which has been calibrated for this location. Solid and dotted lines show the individual contribution from each projector and dashed lines show total perceived brightness. Further, FIG. 4B depicts a perceived brightness for viewer B.

One embodiment is to increase the width of the blend zone so that the gradient in the brightness change as shown in FIGS. 4A and 4B is less than a Just Noticeable Difference (JND). Typically, for abrupt changes a JND may be at or around approximately one percent variation of the brightness intensity. This may employ measurements of the maximum slope of the gain curve for the screen material, t, and d for the installation. The projectors may then be overlapped sufficiently to ensure that the gradient within the transition zone is less than a JND for all observers. As noted above, increasing the width of the transition zone decreases the total area of the display as well as possibly decreasing the resolution within the transition zone.

Preferred embodiments may ensure that the angular difference between the rays coming from the two projectors within the transition zone is minimal.

Figure 5:
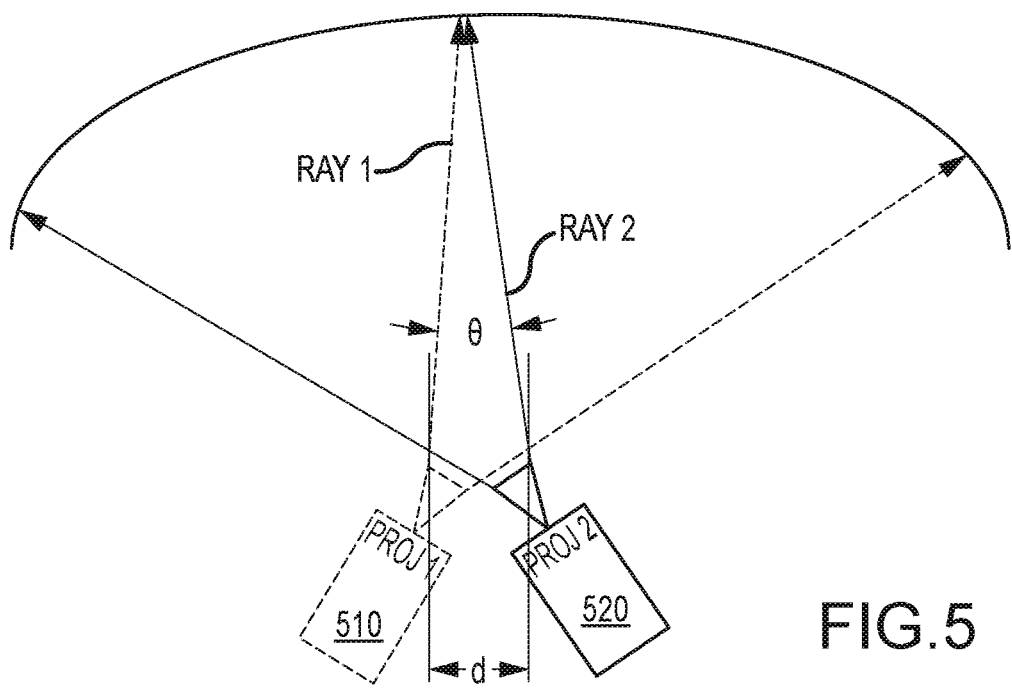
FIG. 5 is a schematic diagram illustrating one embodiment of a multi-projector stitched image with toed-in projectors, in accordance with the present disclosure.

FIG. 5 is a schematic diagram illustrating one embodiment of a multi-projector system 500 with toed-in projectors 510, 520. Further, FIG. 5 illustrates projecting a stitched image onto a screen 530 from two projectors 510, 520. In FIG. 5, the projectors 510, 520 are moved as close as possible and "toed-in" to minimize angular difference, theta, between overlap rays 1 and 2 caused by the distance d between their origination points. Additionally, as illustrated in FIG. 5, the projectors 510, 520 may be located close together and also angled toward one another to provide an overlapping image.

FIG. 5 shows a configuration in which the interference from the bodies of the projectors is substantially eliminated by "toe-ing" them together such that the illumination paths cross. This allows the projection lenses to be positioned as close as possible. There may still be an angular deviation between the rays within the transition region. In this case d is approximately double the width of the projection lens. In combination with a sufficiently wide transition region, this may be adequate in many instances.

Figure 6:
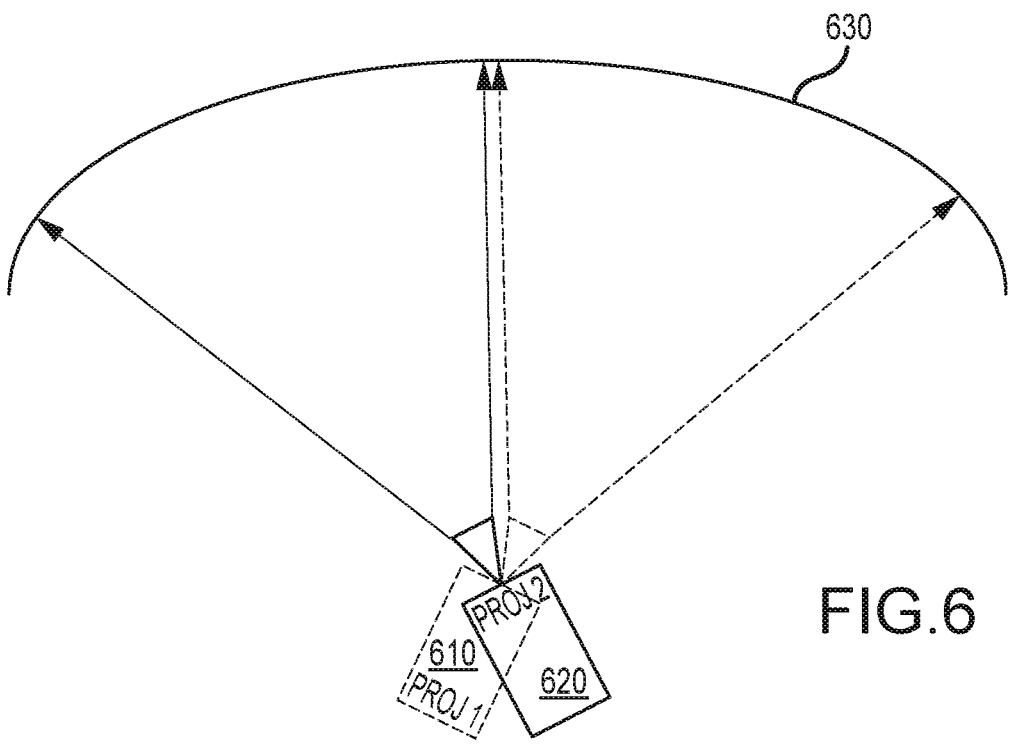
FIG. 6 is a schematic diagram illustrating one embodiment of a multi-projector image with vertically stacked projectors, in accordance with the present disclosure.

FIG. 6 is a schematic diagram illustrating one embodiment of a multi-projector system 600 with vertically stacked projectors 610, 620. Further, FIG. 6 illustrates a schematic of projecting a stitched image onto a screen 630 from two projectors 610, 620. Additionally, in FIG. 6, the projectors 610, 620 are moved as close as possible and "toed-in" to minimize angular difference theta. Furthermore, the projectors may be stacked so that in the horizontal plane, the rays in the overlap region, overlap.

FIG. 6 shows a stacked configuration in which it is possible to completely overlap the rays within the transition region in the horizontal axis. In this case, there is still an angular deviation within the transition region due to the finite height difference of the projectors. This configuration may be advantageous when used in conjunction with polarization recirculation optics which may have a very wide exit aperture, but limited in height. Additionally, some of the embodiments discussed herein may also be located in a stacked configuration as appropriate.

Figure 7:
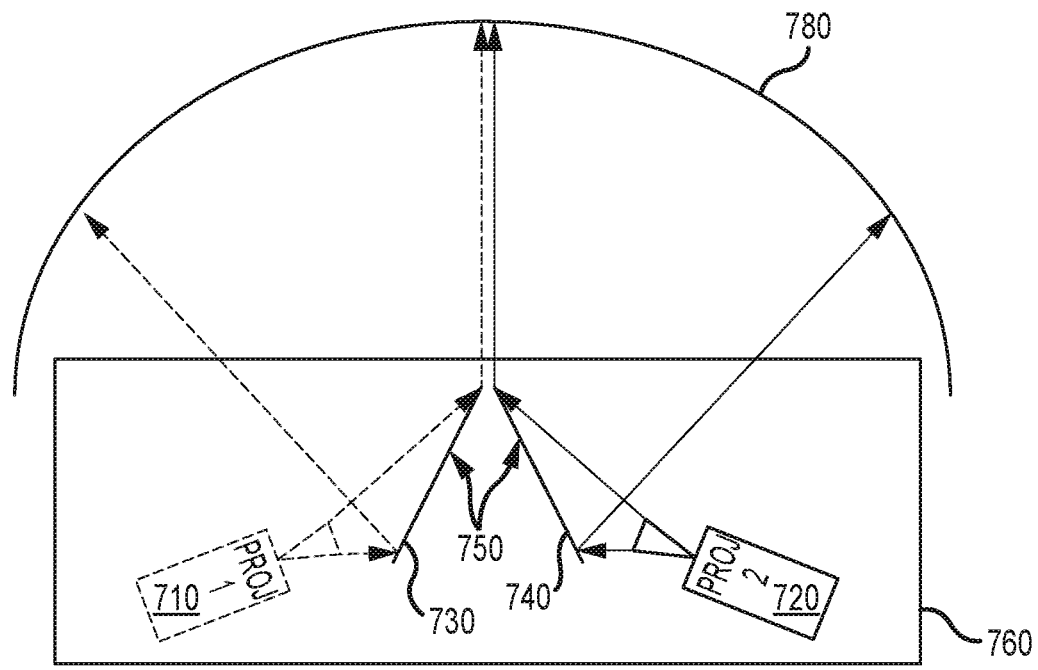
FIG. 7 is a schematic diagram illustrating one embodiment of a multi-projector image with dual reflective elements, in accordance with the present disclosure.

FIG. 7 is a schematic diagram illustrating one embodiment of a multi-projector system 700 with at least two projectors and at least one reflective element configured to form a stitched image. FIG. 7 illustrates an embodiment of the system 700 that may include two projectors 710, 720 configured to project imagery light for forming a stitched image. For example, the two projectors 710, 720 may be configured project first and second portions of a stitched image. As shown in FIG. 7, the system 700 may further include a pair of reflective elements 730, 740 disposed in the light paths of the projectors 710, 720, respectively, to redirect and position imagery light to form the stitched image on the screen 780.

In an embodiment the reflective elements 730, 740 may include folder mirrors. In another embodiment, the reflective element 730, 740 may include mirrors, prisms, right angle prisms, any combination thereof, and so forth. System 700 allows for much improved overlap of the rays within the transition region. The angular deviation may be limited by the finite size of the mirrors and the gap if any at the apex. Furthermore, in order to achieve some degree of overlap for blending of the images, the angular deviation may be slightly increased by positioning of at least one of the projectors 710, 720 and the reflective elements 730, 740. In any case, the angular deviation may be much less than that found in any of the previous cases. In an embodiment, the angular deviation between the projectors 710, 720 may preferably be in the range of about 0° to about 1°.

In an embodiment, the system 700 may include at least one adjustment mechanism 750 for adjusting the position and/or angle of at least one of the projectors 710, 720 and the reflective elements 730, 740. In an embodiment, system 700 may include a housing 760 configure to provide structural support for the above discussed elements of the system 700 while being configured with predetermined clearance for a plurality of positions and angles of at least one of the projectors 710, 720 and the reflective elements 730, 740. In an embodiment, the housing 760 may be configured to allow for a plurality of predetermined angular and positional alignments of the projectors 710, 720 and the reflective elements 730, 740, which in turn allows for a plurality of size of the transition region. It is to be appreciated that the housing 760 may be included in any embodiment of the present disclosure in the same manner as discussed herein even though no such a housing is shown in some embodiments.

Figure 8:
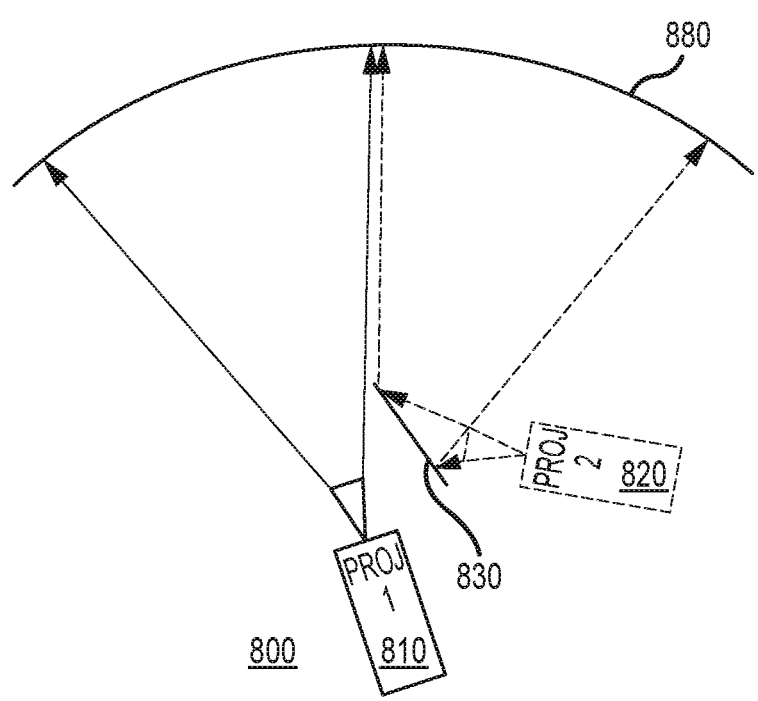
FIG. 8 is a schematic diagram illustrating one embodiment of a dual projector image with one reflective element, in accordance with the present disclosure.

FIG. 8 is a schematic diagram illustrating another embodiment of a multi-projector system 800 with at least two projectors and at least one reflective element configured to form a stitched image. FIG. 8 illustrates an embodiment of the system 800 that may include two projectors 810, 820 configured to project imagery light for forming a stitched image. For example, the two projectors 810, 820 may be configured project first and second portions of a stitched image. As shown in FIG. 8, the system 800 may further include one reflective elements 830 disposed in the light paths of the projector 810 to redirect and position imagery light along with imagery light from the projector 820 to form the stitched image on the screen 880.

Figure 9:
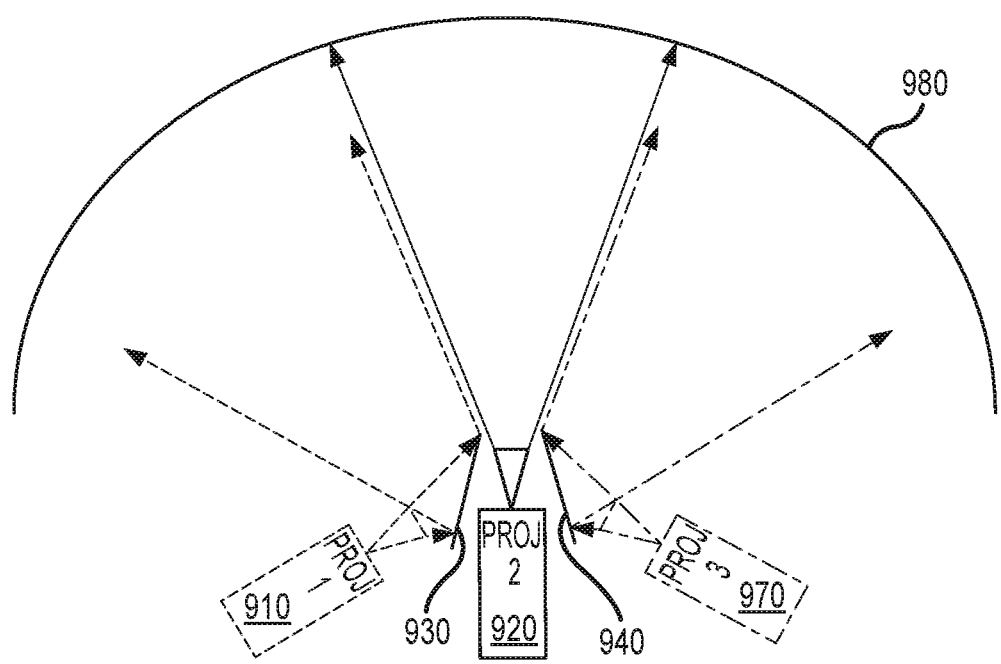
FIG. 9 is a schematic diagram illustrating one embodiment of a 3-projector stitched image with two reflective elements, in accordance with the present disclosure.

In an embodiment, projector 820 is positioned such that the magnification of both projectors 810 and 820 on screen 830 is closely matched. This case can be further improved with an additional projector as shown in FIG. 9. FIG. 9 is a schematic diagram illustrating one embodiment of a 3-projector stitched image with two reflective elements. Further, FIG. 9 illustrates an embodiment of the system 900 that may include three projectors 910, 920, 970 configured to project imagery light for forming a stitched image. For example, the projectors 910, 920, and 930 may be configured project first, second, and third portions of a stitched image, respectively. As shown in FIG. 9, the system 900 may further include reflective elements 930, 940 disposed in the light paths of two of the projectors 910, 920, and 950 to redirect and position imagery light along with imagery light from the remaining of the projectors 910, 920, and 950 to form the stitched image on the screen 980.

If two side projectors 910, 920 are used with reflective elements 930, 940 as shown in the exemplary embodiment in FIG. 9, then not only is the brightness, width, and/or resolution of the image increased, but the blend regions with possibly diminished resolution are no longer within the central part of the image.

Figure 10:
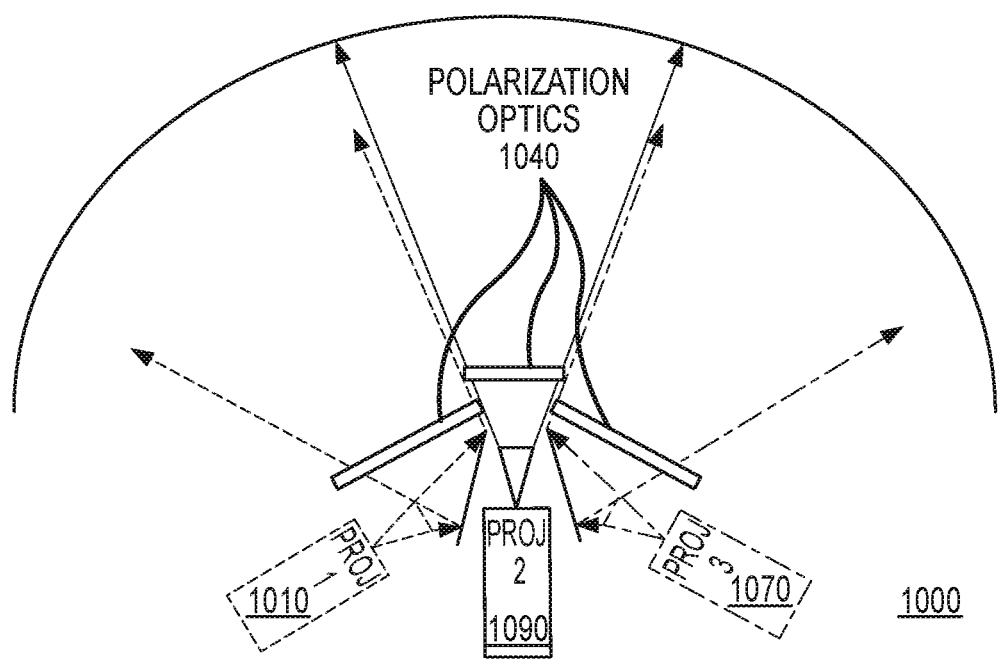
FIG. 10 is a schematic diagram illustrating one embodiment of a 3-projector stitched image with polarization optics, in accordance with the present disclosure.
Figure 11:
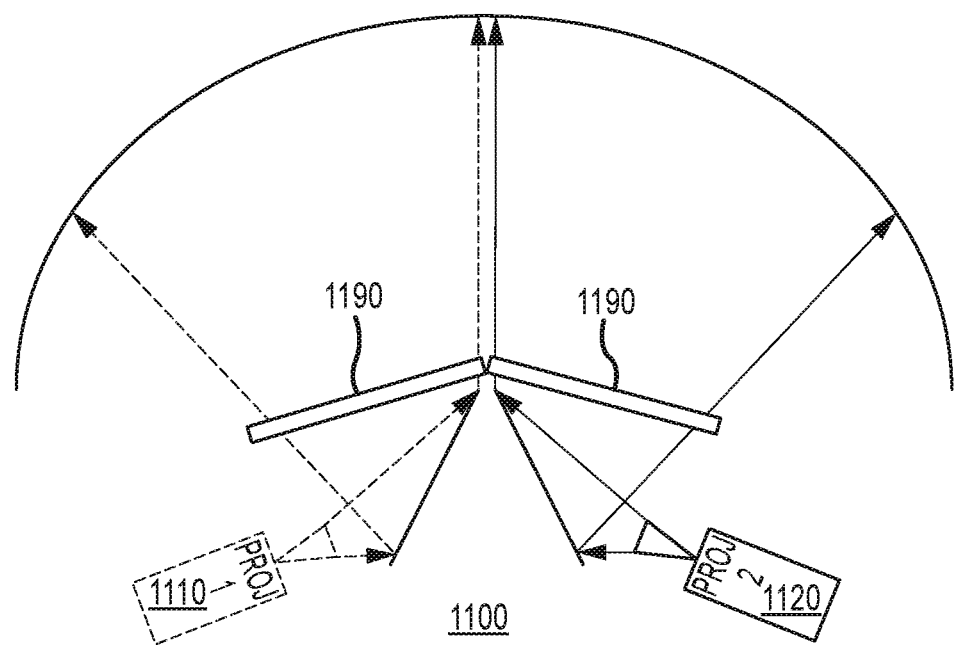
FIG. 11 is a schematic diagram illustrating one embodiment of a 3-projector stitched image with polarization optics, in accordance with the present disclosure.
Figure 12:
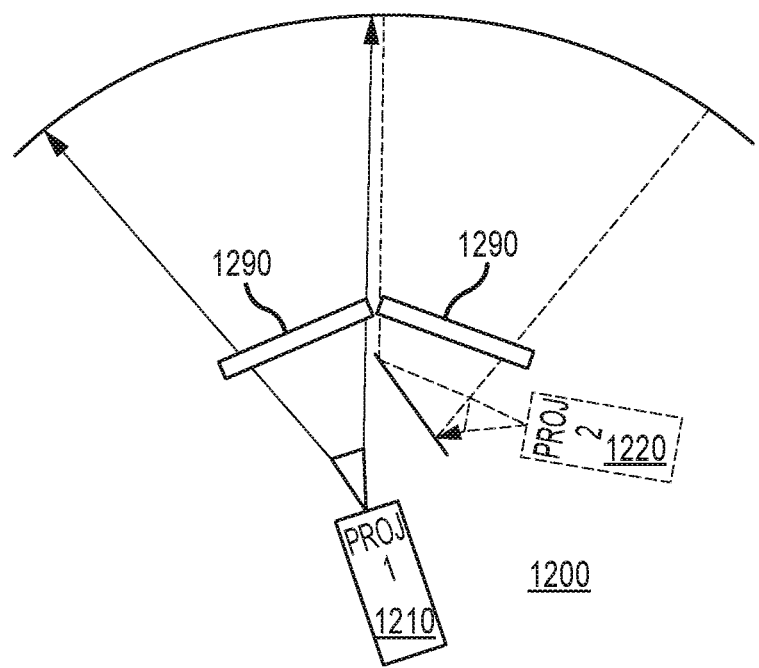
FIG. 12 is a schematic diagram illustrating one embodiment of a 3-projector stitched image with polarization optics, in accordance with the present disclosure.

In order to display polarization based 3D stereo, it is typical to use a polarization switching component such as the RealD Z-Screen, XL, or similar components as discussed at least in the commonly owned U.S. Pat. No. 7,905,602, entitled "Polarization conversion systems for stereoscopic projection," to Schuck et al, filed Sep. 28, 2007, and U.S. Pat. No. 7,857,455, entitled "Combining P and S rays for bright stereoscopic projection," to Cowan et al, filed Oct. 18, 2006, both of which are herein incorporated by reference in their entireties, in order to switch the polarization of the light. FIG. 10 shows an embodiment of a system 1000 that is similar to system 900 as discussed above except polarization optics including polarization switching optics 1090 have been added to the light path of each projector 1010, 1020, 1070. FIG. 11 shows an embodiment of a system 1100 that is similar to system 700 as discussed above except polarization optics including polarization switching optics 1190 have been added to the light path of each projector 1110 and 1120. FIG. 12 shows an embodiment of a system 1200 that is similar to system 800 as discussed above except polarization optics including polarization switching optics 1290 have been added to the light path of each projector 1210 and 1220. It is to be appreciated that if the polarization switching optics 1090, 1190, and 1290 may be disposed before or after the reflective elements.

Polarization optics typically have a central axis along which they perform with highest contrast. As the angle through the optics increases the contrast decreases. This effect can be compensated by a number of methods as disclosed in the commonly owned U.S. Pat. No. 8,851,680, entitled "Polarization compensated stereoscopic systems," to Sharp et al, filed May 14, 2012, which is herein incorporated by reference in its entirety. In a multiple projector configuration, the high contrast axis of the polarization switch need not match the projection direction of the projector. As shown in FIG. 10, because most of the content in many films is in the center of the screen, it is advantageous to tilt the polarization optics so that the highest contrast direction points closer to the middle of the screen. Additionally, passive polarization modulators may be used.

Figure 13:
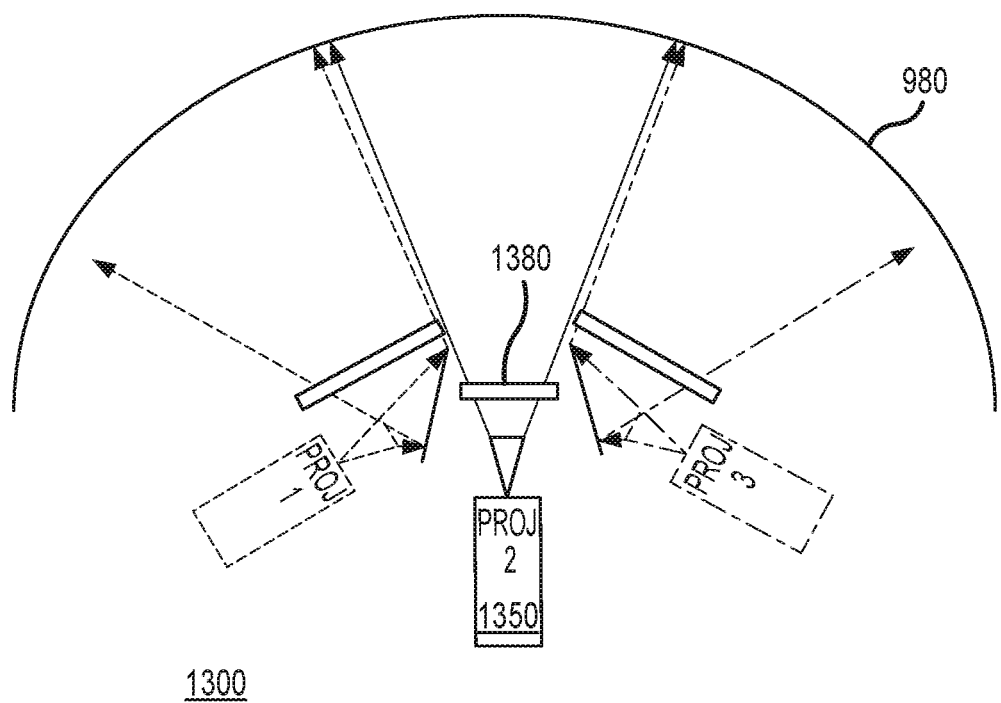
FIG. 13 is a schematic diagram illustrating one embodiment of a 3-projector stitched image with central projector pulled back for polarization optics, in accordance with the present disclosure.

If sufficiently large switches are available, then multiple projectors can share the same polarization switch. The relative positions of the projectors may be adjusted to accommodate the polarization switch optics as shown in FIG. 13. FIG. 13 is a schematic diagram illustrating one embodiment of a system 1300 that is similar to system 1000 as discussed above except the central projector 1350 is pulled back for polarization switching optics 1390. Additionally, passive polarization modulators may be used.

In some cases, stereo 3D may be employed in the central part of the image. In this case, the satellite projectors do not need polarization optics.

Figure 14:
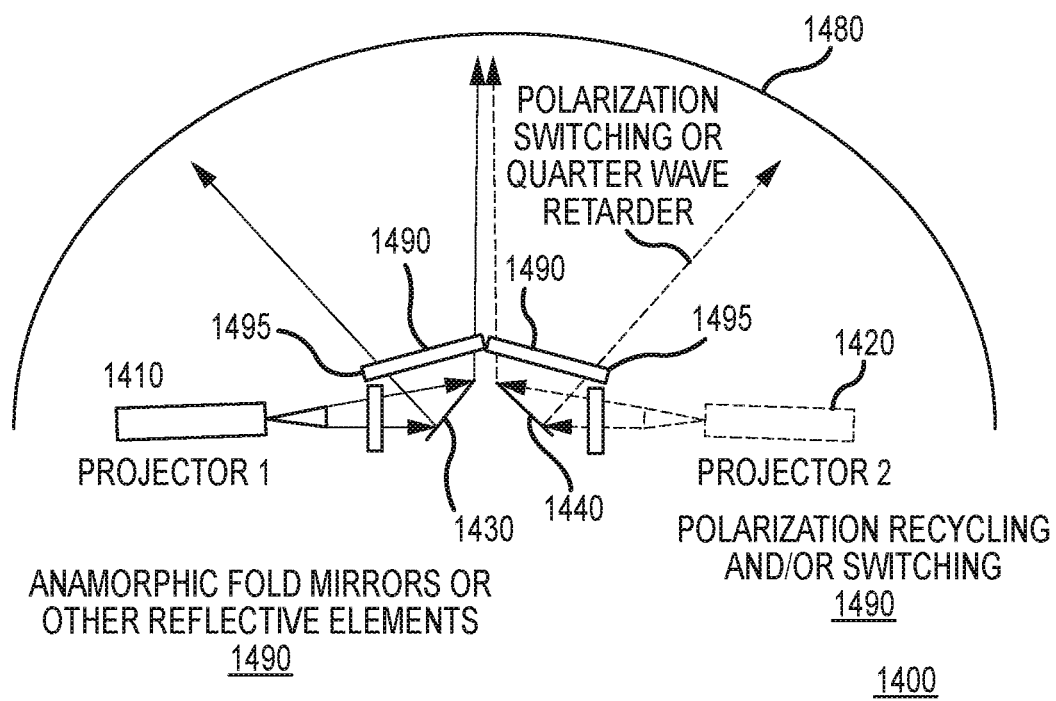
FIG. 14 is a schematic diagram illustrating one embodiment of a 2-projector stitched image with cylindrically curved fold mirror and polarization optics, in accordance with the present disclosure.

In an embodiment, one disadvantage of polarization recycling technology may be that the optics can be quite large and the beam size at the exit increases rapidly. In order to minimize the size of the components, an anamorphic reflector may be used in conjunction with a longer throw lens as shown in FIG. 14. FIG. 14 is a schematic diagram illustrating one embodiment of a system 1400 forming a 2-projector stitched image with cylindrically curved fold mirror and polarization optics. The system 1400 may include two projectors 1410, 1420 configured to project imagery light for forming a stitched image. For example, the two projectors 1410, 1420 may be configured project first and second portions of a stitched image. As shown in FIG. 14, the system 1400 may further include a pair of reflective elements 1430, 1440 disposed in the light paths of the projectors 1410, 1420, respectively, to redirect and position imagery light to form the stitched image on the screen 1480. In an embodiment, the reflective elements 1430, 1440 may include anamorphic reflective elements 1430, 1440 and the system 1400 may further include polarization switching optics 1490. In this case, the imagery light beams from the projectors 1410, 1420 stay small until the anamorphic reflective elements 1430, 1440 which then redirect the imagery light and increases the horizontal spread of the respective image portions. The polarization recycling can occur upstream of the anamorphic reflective elements 1430, 1440. The active switching of the polarization can either occur before or after the anamorphic reflective elements 1430, 1440. If the polarization switching is performed before the anamorphic reflective elements 1430, 1440 then the polarization optics 1490 may include a quarter wave retarder 1495 added both to the switch and after the switch in order to compensate for polarization changes at the reflective elements 1430, 1440 as disclosed in commonly owned U.S. Pat. No. 8,328,362, entitled "Waveplate compensation in projection polarization conversion system," to Coleman et al, filed Feb. 24, 2011, which is herein incorporated by reference in its entirety. The anamorphic reflective elements 1430, 1440 may be used in the three projector configurations shown in FIGS. 9 and 10 although care may be taken to match the vertical field of the non-folded central projector to the folded side projectors.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

It should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A multi-projector system, comprising:
a plurality of projectors configured to project imagery light, the plurality of projectors comprising:
a first projector configured to project a first portion of a stitched image along a first light path; and
a second projector configured to project a second portion of a stitched image along a second light path; and
a first reflective element disposed in the first light path, wherein the first reflective element is configured to align the first light path relative to the second light path such that the stitched image comprises a transition region in which the first portion and second portion of the stitched image overlap, and imagery light from the first projector comprises a first edge ray in the transition region and imagery light from the second projector comprises a second edge ray neighboring the first edge ray in the transition region, wherein the first and second edge rays have an angular deviation, theta, therebetween, ranging between about 0° to about 1°.

2. The multi-projector system of claim 1, further comprising a second reflective element disposed in the second light path, wherein the first and second reflective elements cooperate to align the first and second light paths such that the stitched image comprises the transition region.

3. The multi-projector system of claim 1, wherein the plurality of projectors comprise a third projector configured to a project a third portion of a stitched image along a third light path, and wherein, the multi-projector system further comprises a second reflective element disposed in the third light path, wherein the second reflective element is configured to align the third light path relative to the second light path such that the stitched image comprises a second transition region where second and third portions of the stitched image overlap.

4. The multi-projector system of claim 3, furthering comprising polarization optics disposed in the first, second, and third light paths.

5. The multi-projector system of claim 4, wherein the polarization optics comprise at least one polarization switch.

6. The multi-projector system of claim 4, wherein the polarization optics comprise a polarization switch in each of the first, second, and third light path.

7. The multi-projector system of claim 6, wherein the polarization switches in the first and third light paths optically follow the first and second reflective elements, respectively.

8. The multi-projector system of claim 1, wherein the first reflective element comprises a folding mirror.

9. The multi-projector system of claim 1, wherein the first reflective element comprises an anamorphic reflective element.

10. A multi-projector unit comprising:
a housing; a plurality of projectors configured to project imagery light, the plurality of projectors comprising:
a first projector disposed in the housing and configured to project a first portion of a stitched image along a first light path; and
a second projector disposed in the housing and configured to project a second portion of a stitched image along a second light path; and
a first reflective element disposed in the first light path, wherein the first reflective element is configured to align the first light path relative to the second light path such that the stitched image comprises a transition region in which the first portion and second portion of the stitched image overlap; wherein the housing is configured with predetermined clearance for a plurality of alignments of the first and second light paths;
wherein the predetermined clearance is configured to allow an angular deviation, theta, ranging from about 0° to about 1° between a first edge ray of imagery light from the first projector and a second edge ray of image light from the second projector, the first and second edge rays neighboring each other.

11. The multi-projector unit of claim 10, further comprising a second reflective element disposed in the second light path, wherein the first and second reflective elements cooperate to align the first and second light paths such that the stitched image comprises the transition region.

12. The multi-projector unit of claim 10, wherein the plurality of projectors comprise a third projector configured to a project a third portion of a stitched image along a third light path, and wherein, the multi-projector system further comprises a second reflective element disposed in the third light path, wherein the second reflective element is configured to align the third light path relative to the second light path such that the stitched image comprises a second transition region where second and third portions of the stitched image overlap.

13. The multi-projector unit of claim 12, furthering comprising polarization optics disposed in the first, second, and third light paths.

14. The multi-projector unit of claim 13, wherein the polarization optics comprise at least one polarization switch.

15. The multi-projector unit of claim 13, wherein the polarization optics comprise a polarization switch in each of the first, second, and third light path.

16. The multi-projector unit of claim 15, wherein the polarization switches in the first and third light paths optically follow the first and second reflective elements, respectively.

17. The multi-projector unit of claim 10, wherein the first reflective element comprises a folding mirror.

18. The multi-projector unit of claim 10, wherein the first reflective element comprises an anamorphic reflective element.

19. The multi-projector unit of claim 10, furthering comprising an adjustment mechanism for adjusting the position of at least one of the first projector, the second projector, and the first reflective element.

20. A multi-projector display system comprising:
a gain screen;
a plurality of projectors configured to project imagery light to the gain screen, the plurality of projectors comprising:
a first projector configured to project a first portion of a stitched image along a first light path; and
a second projector configured to project a second portion of a stitched image along a second light path; and
a reflective element disposed in the first light path, wherein the reflective element is configured to align the first light path relative to the second light path such that such that the stitched image comprises a transition region in which the first portion and second portion of the stitched image overlap, and a gradient within the transition region is less than approximately one percent variation of a brightness intensity in the transition region.

* * * * *